March 3, 1959 T. H. SNETHEN 2,876,057

RECORD FILING AND STORAGE EQUIPMENT

Filed Jan. 29, 1958 4 Sheets-Sheet 1

INVENTOR.
Thomas Howard Snethen
BY
Richard S. Hayes
ATTORNEY

March 3, 1959 T. H. SNETHEN 2,876,057

RECORD FILING AND STORAGE EQUIPMENT

Filed Jan. 29, 1958 4 Sheets-Sheet 2

INVENTOR.

Thomas Howard Snethen

BY

Richmond S. Hayes

ATTORNEY

March 3, 1959 T. H. SNETHEN 2,876,057

RECORD FILING AND STORAGE EQUIPMENT

Filed Jan. 29, 1958 4 Sheets-Sheet 3

INVENTOR.
Thomas Howard Snethen
BY
Richmond L. Hayes
ATTORNEY.

March 3, 1959 T. H. SNETHEN 2,876,057

RECORD FILING AND STORAGE EQUIPMENT

Filed Jan. 29, 1958 4 Sheets-Sheet 4

INVENTOR

Thomas Howard Snethen

BY Richmond S. Hayes

ATTORNEY

United States Patent Office 2,876,057
Patented Mar. 3, 1959

2,876,057

RECORD FILING AND STORAGE EQUIPMENT

Thomas Howard Snethen, Dewittville, N. Y., assignor to Watson Manufacturing Company, Inc., Jamestown, N. Y., a corporation of New York Application January 29, 1958, Serial No. 711,968

11 Claims. (Cl. 312—303)

This invention relates to filing equipment for the storage and handling of large quantities of records. More particularly, the invention is directed to structure enabling use of such filing equipment with various kinds of bookkeeping machines and especially those of the electronic type which, as is well known, are designed for the rapid posting of ledgers or other records.

The preparing and maintaining of records has previously been largely accomplished by means of hand posting or conventional bookkeeping machines, or some combination of both. Many kinds of receptacles or containers have been provided to preserve records in an arrangement and order best suited to the various recording operations. By way of illustration, hand and machine posting has been greatly aided by the use of record holding tubs or containers of the types disclosed in Patents No. 2,552,434 and No. 2,684,277. However, there are many instances in record handling wherein large quantities of records must, at all times, be available with up-to-the-minute data. To provide and maintain such records requires the use of modern recording equipment and, of course, files that make records instantly available for both reference and posting. For example, many banks, industries, and governmental departments are of such size as to require extremely rapid handling of records if the data thereon is to be currently accurate.

An electronic bookkeeping machine appears to meet the requirements for extremely rapid and accurate posting but, obviously, the use of such a machine is limited to the ability of the operator to find and present ledger or other record sheets to the machine for the necessary computation or posting and replace or refile the sheets in a storage receptacle. In other words, the machine is not in itself the answer to accurate, high speed production and maintenance of records. It must be accompanied by filing equipment that eliminates all possible time consuming movements of the machine operator in the finding, removing, and replacing of records that are to be posted or otherwise worked upon.

The present invention is therefore directed to and has for its principal object the provision of file storage equipment designed for use with electronic bookkeeping machines.

It is another object of the invention to provide record storage equipment that enables a machine operator, adjacent the equipment, to quickly and easily move any of the records to a convenient position of observation and use.

It is a further and most important object of the invention to break any given quantity of records into comparatively small units through the use of movable record receiving trays that, when selectively moved to an approximate position of use by a stationary operator, may be further moved or adjusted for most suitable viewability and accessibility of such an operator.

It is also an important object of the invention to provide a record receiving container that while primarily designed for immediate accessibility by a machine operator, also enables random reference to the receptacle contents without interfering with a reference or posting operation by another operator.

Many other objects and advantages will become apparent from consideration of the following specification, taken in conjunction with the accompanying drawings; in which Fig. 1 is a perspective view of a multiple tray filing receptacle embodying the invention, one of the trays being shown in position to make the contents thereof available to an adjacent bookkeeping machine operator;

Figure 10:
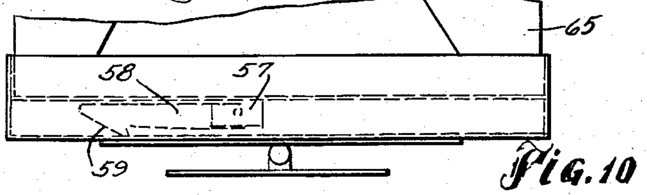
Figure 9:
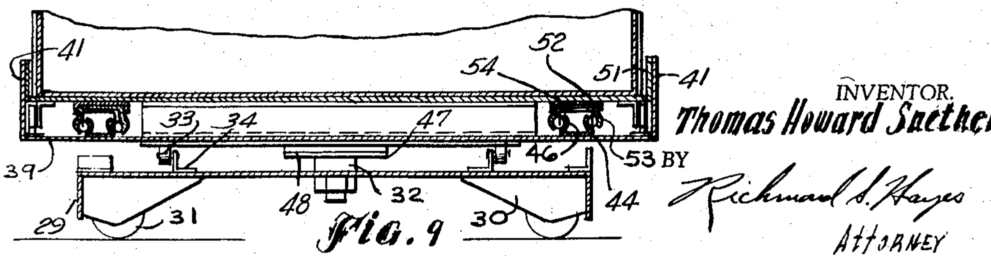
Figures 2, 6, 7:
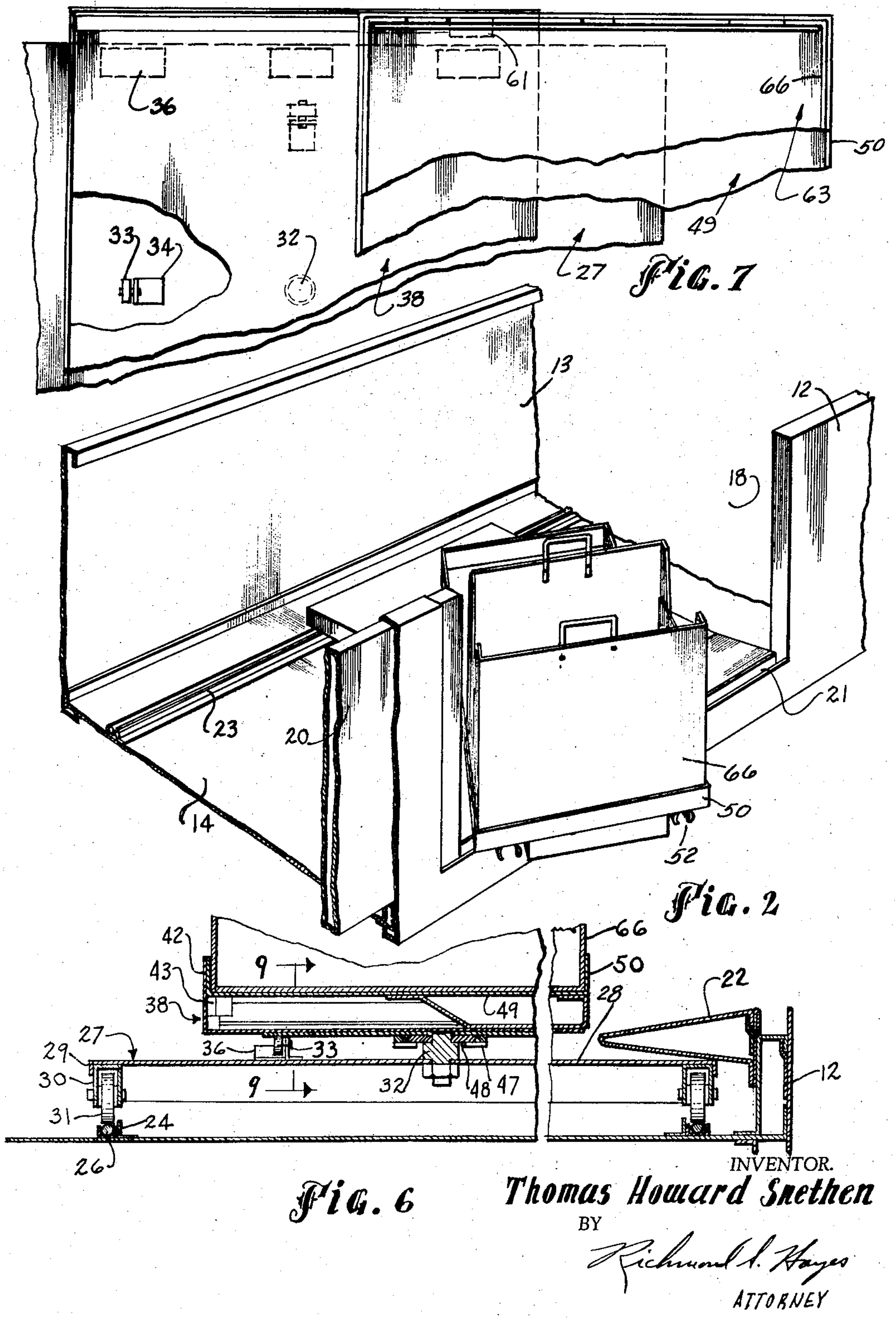
Fig. 2 is a detailed enlargement of a portion of the file receptacle with one of the trays in position of use substantially as shown in Fig. 1.
Fig. 6 is an enlarged sectional view of a portion of the structure in Fig. 4 and shows details of the carriage and pan support for the record tray.
Fig. 7 is an enlarged top plan view of the central portion of the structure shown in Fig. 3, parts being broken away to disclose the relationship of all of the supporting structure for a given tray.
Figure 4:
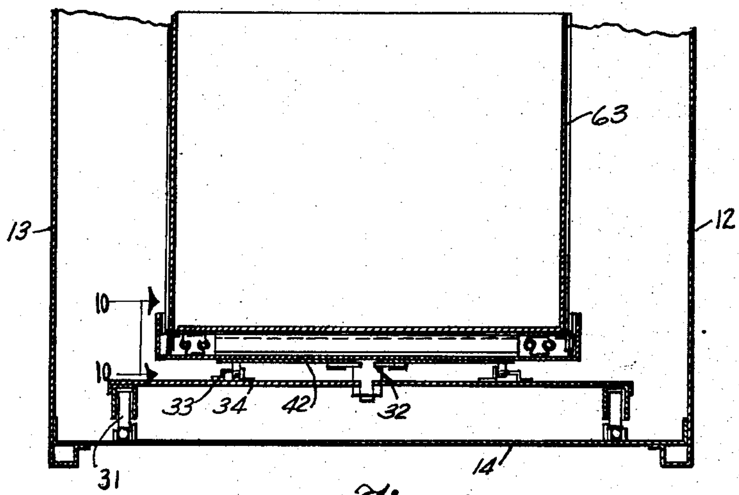
Fig. 4 is an enlarged vertical transverse sectional view taken substantially on the line 4—4 of Fig. 3.
Figure 5:
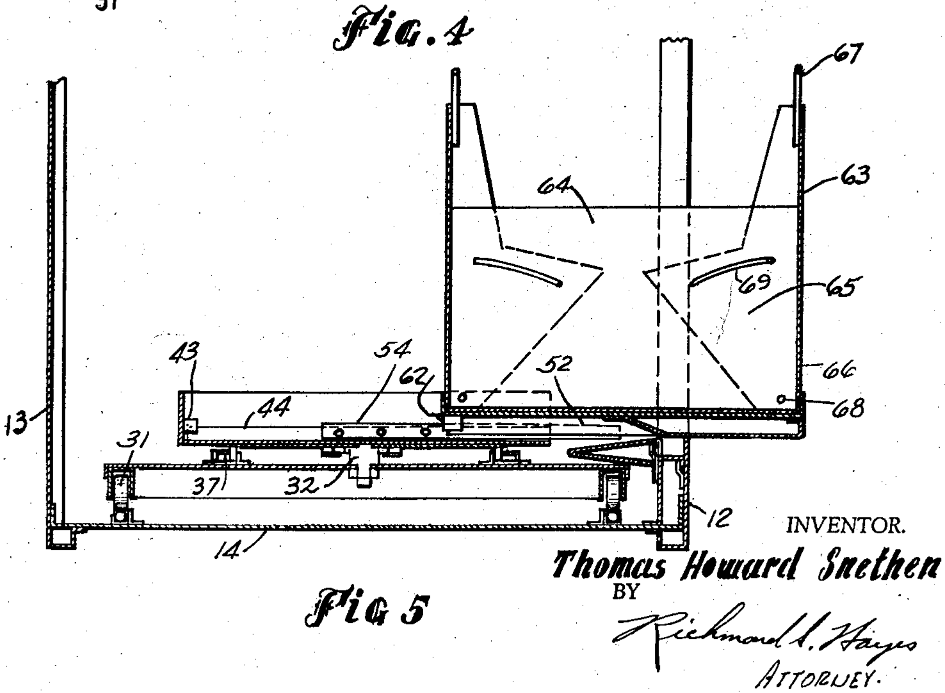
Fig. 5 is an enlarged vertical transverse sectional view taken substantially on the line 5—5 of Fig. 3.

Fig. 9 is an enlarged fragmentary transverse vertical sectional view, taken substantially on the line 9—9 of Fig. 6 and shows the anti-friction mounting of the tray support on the rotatable pan; and Fig. 10 is an enlarged fragmentary elevational view, parts being broken away to disclose means for securing the tray support in extended position, being taken substantially as suggested by the line 10—10 of Fig. 4.

Referring more particularly to the drawings, the reference numeral 10 is employed to generally designate a unit of filing equipment which takes the form of an elongated receptacle. The receptacle is formed by end panels 11, front and rear walls 12 and 13 and a base wall 14. At the jointure of the front and rear walls with panels 11, suitable posts or legs 16 are provided which support the receptacle at the desired elevation. One or more covers 17 are carried by the rear wall 13 in any suitable manner and may be moved from the position shown in Fig. 1 to a position to close the top opening of the receptacle. The front wall 12, approximately midway of its length, is cut away to form an opening 18. This opening, since it is intended to give access to the interior of the receptacle through the front thereof, is hereinafter defined as an access opening. As may be particularly noted in Figs. 2 and 8, the upper edge of the wall 12 has a downwardly opening channel 19 in which the upper edge of a door 20 is fitted. The lower edge of this door is seated in a lower channel 21 and, of course, with the channels as guides, the door may be slid into a position to close the access opening or area 18. Extending inwardly from the lower edge of the access opening 18 is a downwardly inclined ramp 22. This ramp is designed to extend over the carriages (see Fig. 6) and just beneath the front ends of pans mounted on said carriages. With the exception of the details described pertaining to the front wall 12, provision for the sliding door 20 and the ramp 22, the general construction of the receptacle 10 is of no importance to the invention and, therefore, is neither shown nor described in detail.

It is, of course, a purpose of the invention to mount record trays in the receptacle and to make them individually and selectively available to a stationary operator at the access opening 18. To this end, a pair of tracks 23 are provided and extend lengthwise of the receptacle in fairly near proximity with the front and rear receptacle walls 12 and 13. These tracks, as suggested in Fig. 6, are formed by channels, each of which has an inner wall 24 somewhat higher than the outer wall. Mounted in each of these channels is a rail 26 which is slightly below the inner channel wall 24 but extends somewhat above the outer channel wall.

Figure 8:
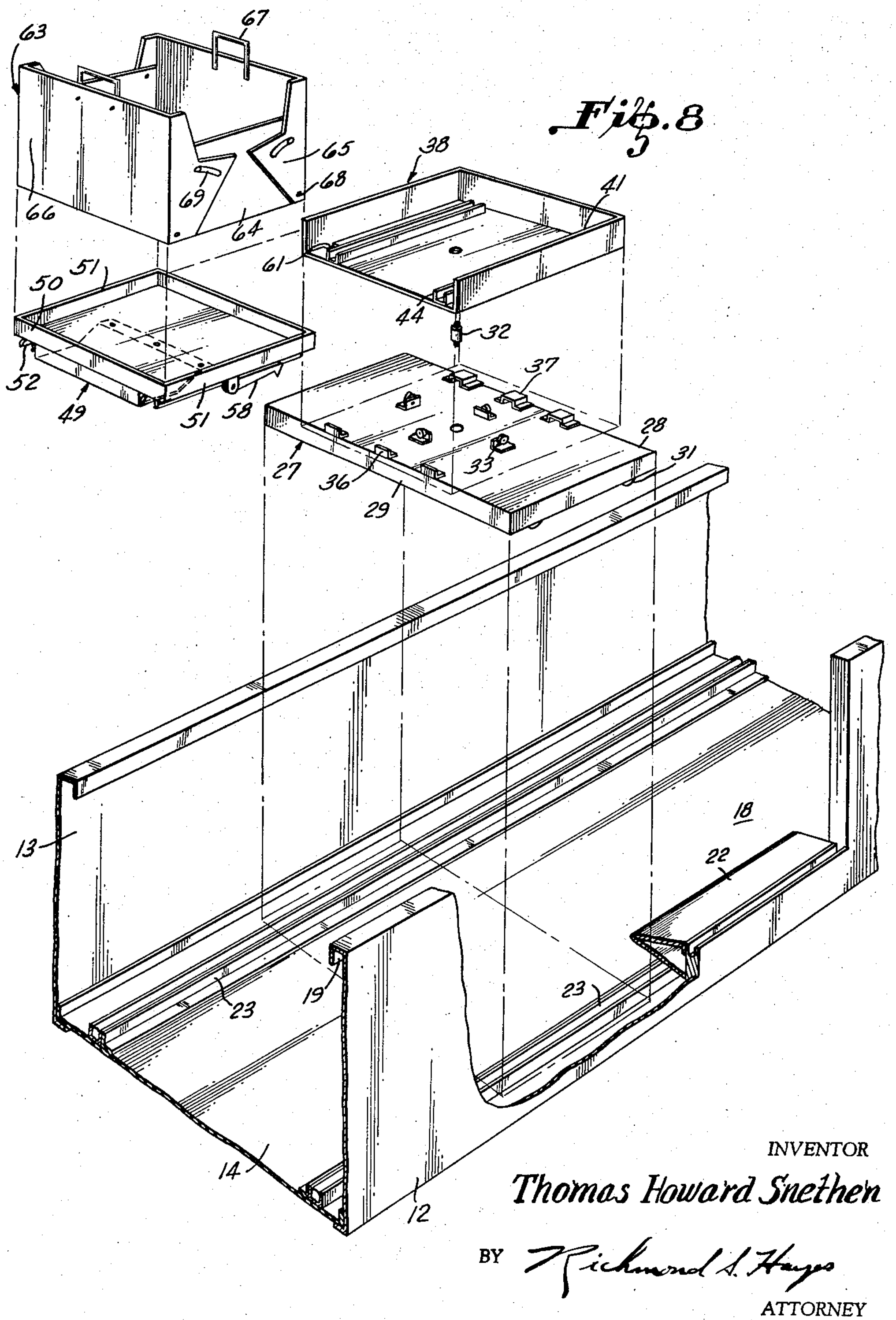
Fig. 8 is a fragmentary exploded perspective view of the structure of the invention and shows the relationship of all the members thereof; namely, receptacle, carriage, rotatable pan, tray support and tray.

A number of carriages, generally designated by the numeral 27, are intended to be mounted on the tracks 23, the particular number of carriages being in part determined by their size in relationship to the length of the space within the receptacle 10. The carriages 27 are preferably identical and only one will be described in detail. Each carriage is of generally rectangular shape, extends transversely of the receptacle and consists of a platform 28, the margins of which are defined by depending flanges 29. These flanges not only serve to rigidify the platform but also define the location for brackets 30 in which wheels 31 are mounted. These wheels, of course, engage the tracks 23 and are prevented lateral displacement by reason of the inner channel flanges 24. At its center, the platform 28 is fitted with a pivot pin 32. In its present form, the pin includes a top, horizontal, annular groove as a means for engagement with a pan that is intended to be mounted for horizontal rotation with respect to the carriage. By way of support for the pan, a set of rollers 33 are mounted on the platform 28 by means of brackets 34. Four of these rollers are shown and are uniformly spaced about the pivot pin 32, substantially as shown in Fig. 8. Adjacent one edge of the platform 28 of each carriage is a set of plates 36. Along the opposite edge of the platform is a set of permanent magnets 37. The purpose of these plates and magnets will hereinafter be explained but it will be understood that each of the carriages 27 is so equipped and in the arrangement described.

A pan, generally indicated by the numeral 38, consists of a base wall 39 and upstanding side and rear walls 41 and 42 respectively. Attached to the rear wall 42, adjacent the side walls, are catches 43. Extending the length of the base wall 39 and located adjacent the side walls 42 are channels 44. The side walls of these channels form laterally, outwardly opening, curved guideways 46. Secured to the under surface of the base wall 39 by means of brackets 47 is a supporting washer 48 that engages the annular groove of the pivot pin 32. It will be understood that the pivot pin 32 serves as a guide for horizontal rotation of the pan 38 and that the rollers 33 on the carriage not only support this pan but enable free rotation thereof without regard for any weight that may be carried by it.

A tray support or mounting member 49 is intended to be seated on the pan 38. This support, in the present showing, generally takes the form of a pan and includes front and rear walls 50 and side walls 51. Depending from this support are channels 52, one being located adjacent each side of the support. The side walls of these channels are curved and provide inwardly opening guideways 52, the side walls of the channels 52 receiving the side walls 46 of the pan carried channels 44. Interposed between the walls of these two channels is a cage 54 which mounts ball bearings 56. The bearings 56 engage the tracks of both channels. This structure not only provides proper mounting for tray support on the pan 38, but enables free movement of the support into the access opening 18 when carrying the added weight of a filled record tray. Also secured to the under face of the support 49 is a pair of brackets 57, each bracket being located adjacent the side of the support and pivotally mounting a gravity latch 58. These latches, when the tray support is withdrawn from the pan, ride along the base of the pan to a point where the hook portion 59 drops into an opening 61, engaging the pan and preventing further withdrawal of the support. At the rear of tray support is a pair of stops 62 which, when the support has been moved completely into the pan, are engaged by the catches 43.

Figure 3:
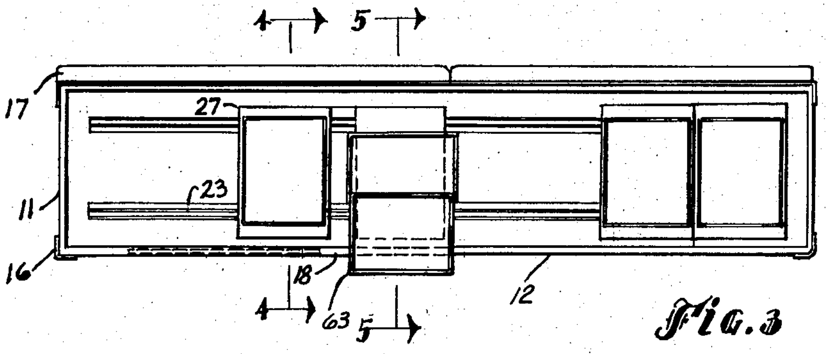
Fig. 3 is a top plan view of the receptacle showing one record tray in partly withdrawn position.

A tray, generally indicated at 63, is intended to be seated on the member 49, the relative proportion of support walls to the size of the tray base being such that the tray may readily be set into it or removed from it but will, nevertheless, be prevented displacement under ordinary conditions of use. As clearly shown in Fig. 3, the box-like tray is so proportioned that it could be rotated a full 360° while wholly within the receptacle and without contacting either the front or rear walls 12 and 13 thereof. In the present instance, the tray is shown as having side walls 64 and front and rear walls 66. The walls 66 may include upstanding handles 67 and are pivoted, as at 68, to the walls 64 by wings 65. To control the extent of pivotal movement of the front and rear walls 66, a pin and slot structure 69 is provided. The purpose, of course, in making the walls 66 of the tray swingable about the base pivots 68 is to permit releasing the records within the tray from a compact storage relationship and enable sufficiently tilting such records for examination of the full contents thereof. This means, enabling expanding a file or tray contents for reference and other work, is common in certain types of file drawers wherein a tiltable drawer front, and possibly, tiltable rear wall, are provided.

Figure 1:
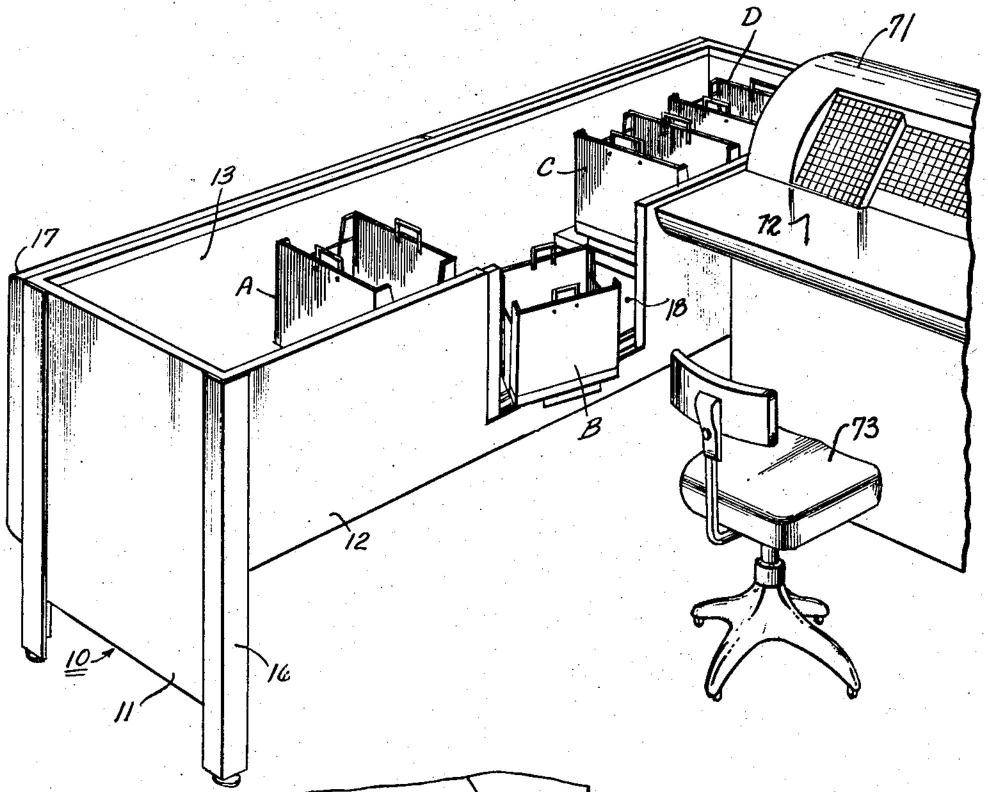

Referring particularly to Fig. 1, one form of electronic bookkeeping machine 71 is shown in outline and includes a work shelf 72 that is approximately in the plane of the top of the receptacle wall 12. The front edge of this shelf preferably aligns with one edge of the access opening 18 of the receptacle. An operator of the machine sits on the stool or chair 73 which, as may be observed, is immediately adjacent the receptacle access opening 18. In the use of electronic bookkeeping machines, ledger or other record sheets are fed into the machine one at a time. The machine automatically reads certain information on the sheet and prints or records any changes in a record caused by an operator's manipulation of certain machine buttons or indicators. For example, the operator may place a ledger sheet in the machine, punch in the account number shown on a check or deposit slip (in the case of a bank), and the machine will automatically pick up the previous balance, add or subtract, print the items in the various columns, and print and record the new balance. As has already been brought out, this operation of posting or otherwise changing records is much faster than either hand posting or use of hand operated bookkeeping machines and, because of this, the operator must have a supply of the records instantly available at all times.

Attention is now particularly directed to the manner in which the present invention materially assists in the rapid reference to and posting of records in conjunction with an electronic bookkeeping machine. The trays 63 are set into the receptacle 10, being located on the mounting members 49 which, of course, are individually carried by pans 38 and carriages 27. In the present instance, four trays are shown to be mounted in a receptacle that has an interior length approximately twice their combined length. The purpose of this is to enable moving any one of the four trays into alignment with the access opening 18. It is to be recalled that the brackets 36 of one carriage are aligned with the magnets 37 of the next carriage and, consequently, when all of the carriages are abutting at one end of the receptacle, a magnetic coupling exists between them. Thus, should an operator wish to work on the contents of the tray designated B instead of the one designated A, it is merely necessary to grasp any one of the trays and pull the entire group to a position such that tray B or the following trays C or D register with the access opening 18. It will be understood that the magnetic coupling of the trays is only sufficiently strong to cause their combined movement along the track 23. However, any one carriage and tray may be easily separated from another as and when required. Due to the fact that each pan 38 is pivotally mounted on its carriage, tray B, when aligned with the access opening, may be rotated 90° from its normal storage position, substantially to the position shown in Fig. 3. The operator now merely grasps the forward handle of tray B and pulls it partially out through the access opening 18, this movement being enabled by the bearing suspension between the pan and the tray supporting member 49. However, since the contents of extended tray B may not be at the most conveniently accessible or observable angle for the operator, it may be turned to almost any desired angle for this purpose, this being clearly suggested both in Figs. 1 and 2. In order to assure free, quick, and easy withdrawal of the tray into and partly through the access opening, the ramp 22 has been provided. This ramp prevents any possibility of downward tilting of the tray and its support which might occur due to the weight of the tray contents. The mobility and accessibility of tray B to a stationary machine operator does not preclude reference to or filing in the other trays—namely, A, C, and D—by another operator from the opposite side of the receptacle. In other words, while the contents of one tray—namely, B—are conveniently available to the machine operator, the remaining trays are so positioned that the contents thereof are simultaneously available for any reference or other work by other persons.

Although applicant has shown and described only one specific structure by which to house a set of record carrying trays and make them individually available to a stationary machine operator, it will be understood that the specific details of structure for accomplishing this, as described with respect to the carriage 27, pan 38, and supporting member 49, may be modified without in any way departing from the spirit and scope of the invention insofar as such modifications are encompassed by the annexed claims.

Having thus set forth my invention, what I claim as new and for which I desire protection by Letters Patent is:

1. In filing equipment, an elongated top opening receptacle, one side wall of said receptacle having an access opening approximately midway of the length thereof, a door movable into and out of a position to close said opening, a plurality of record trays normally so arranged in said receptacle as to render the contents thereof viewable in a common direction, means mounting said trays for individual bodily movement in the direction of the length of said receptacle, said means including rotatable and slidable means enabling horizontally rotating and partial withdrawal of said trays from said receptacle through said access opening.

2. In filing equipment having an elongated top opening receptacle and an access opening in one side wall thereof, means for presenting any of a plurality of record holding trays to said opening, said means comprising a tray support, a pan, anti-friction means mounting said support on said pan for lateral movement of said support into said opening, and track mounted carriages in said receptacle, said carriages supporting said pans for horizontal rotation, said trays thereby being both slidable and rotatable to enable their selective movement into said access opening and at an angle suitable for examination and work on the contents thereof.

3. In filing equipment having an elongated top opening receptacle and an access opening in one side wall thereof; structure in said receptacle for supporting units of records and making them individually available through said access opening, said structure comprising a number of carriages arranged in line and freely movable in the direction of the length of said receptacle, pans on said carriages rotatable about vertical axes, tray supports on said pans, said supports being slidable with respect to said pans in a direction to extend into said access opening when the associated pan and carriage align with said opening, and record carrying trays removably seated on said supports, said opening being proportioned to enable rotating said pan to an extent to enable convenient examination and work on the records in said trays by an operator.

4. In filing equipment having an elongated top opening receptacle and an access opening in one side wall thereof; structure in said receptacle for supporting trays of records and enabling individually and selectively presenting said trays to said access opening, said structure comprising a number of carriages freely movable in the direction of the length of said receptacle, multiple relatively movable means interposed between said trays and said carriages, said means facilitating both horizontal rotation and sliding movement of said trays with respect to said carriages whereby any given tray, when the associated carriage is aligned with said opening, may be partially moved into said opening.

5. In filing equipment, an elongated top opening receptacle, one side wall of said receptacle having an access opening, tracks in said receptacle, a plurality of carriages mounted on said tracks, pans on said carriages, pivot means interposed between said pans and said carriages, said pivot means enabling rotating said pans about a vertical axis, supports having upstanding portions defining areas for locating and securing record trays against lateral movement, anti-friction means mounting said supports on said pans and including guides for limiting movement of said supports to a prescribed horizontal path, trays on said supports, said trays, by reason of their mounting, being selectively movable in the direction of the length of said receptacle to align with said opening and thence being rotatable and slidable to project through said opening and be at an angle suitable for examination and work on the contents thereof.

6. In filing equipment, an elongated top opening receptacle containing a plurality of record receiving trays, one side wall of said receptacle having an access opening, means for presenting any of a plurality of the trays in said receptacle to said opening for examination of the contents thereof, said means comprising a frame-like support for each tray, a pan mounting said tray support for movement relative thereto in one direction, means for limiting the extent of movement of said support with respect to said pan, a track mounted carriage movable in the direction of the length of said recaptacle, and pivot means mounting said pan on said carriage, said pan enabling rotating said tray into a position to render the contents accessible from the side of said receptacle and said support permitting partial withdrawal of said tray from said receptacle through said access opening.

7. In filing equipment having an elongated top opening receptacle and an access opening in one side wall thereof; structure in said receptacle for supporting units of records and making them individually available through said access opening, said structure comprising a number of carriages freely movable in the direction of the length of said receptacle, pans on said carriages rotatable about vertical axes, tray supports on said pans, said supports being slidable with respect to said pans in a direction to extend into said access opening when the associated pan and carriage align with said opening, record carrying trays removably seated on said supports, and means releasably coupling said carriages whereby a remote carriage may be positioned in front of said access opening by moving a nearby carriage in the direction of the length of said receptacle.

8. In filing equipment having an elongated top opening receptacle and an access opening in one side wall thereof, means for presenting any of a plurality of record holding trays to said opening, said means comprising a tray support, a pan, anti-friction means mounting said support on said pan for lateral movement of said support into said opening, and track mounted carriages in said receptacle, said carriages supporting said pans for horizontal rotation, said trays thereby being both slidable and rotatable to enable their selective movement into said access opening and at an angle suitable for examination and work on the contents thereof, and a ramp extending inwardly from the lower edge of said access opening, said ramp, at least in part, carrying the weight of said tray and support when moved into said opening.

9. In filing equipment wherein records are capable of being moved into a position of accessibility for use in connection with a bookkeeping machine, an elongated support, a pair of tracks on said support, a plurality of carriages on said tracks, a pair of relatively movable framelike supports on each of said carriages, one of each pair of supports having upstanding portions defining an area for locating and securing a record tray against lateral movement, said carriages being movable along said tracks to locate any given tray at said machine and enable the operator of said machine to move said tray on said supports into a position to examine the contents thereof.

10. In filing equipment wherein records are capable of manual movement into a position of accessibility for use in connection with a bookkeeping machine, an elongated support, structure on said support for mounting record trays and enabling individually and selectively presenting said trays to an operator of said machine, said structure comprising a number of carriages freely movable in the direction of the length of said support, multiple relatively movable means interposed between said trays and said carriages, said means providing both horizontal rotation and sliding movement of said trays with respect to said carriages whereby any given tray, when the associated carriage is adjacent said machine, may be turned and moved into a convenient position of use by an operator of said machine.

11. In filing equipment having an elongated top opening receptacle and an access opening in one side wall thereof; structure in said receptacle for supporting trays of records and enabling individually and selectively presenting said trays to said access opening, said structure comprising a number of carriages freely movable in the direction of the length of said receptacle, multiple and relatively movable means interposed between said trays and said carriages, said means facilitating both horizontal rotation and sliding movement of said trays with respect to said carriages, and releasable means connecting said carriages for movement as one in the direction of the length of said receptacle.

References Cited in the file of this patent

UNITED STATES PATENTS

| | | |
|---|---|---|
| 2,004,095 | Hankins et al. | June 11, 1935 |
| 2,374,965 | Weston | May 1, 1945 |
| 2,721,780 | Peterson et al. | Oct. 25, 1955 |
| 2,803,514 | Calderon | Aug. 20, 1957 |